(12) United States Patent
Krampitz et al.

(10) Patent No.: US 6,624,641 B1
(45) Date of Patent: Sep. 23, 2003

(54) AIR BAG SIMULATOR AND METHOD OF SIMULATING AN AIR BAG

(75) Inventors: Scott K. Krampitz, Blooming Prairie, MN (US); Corey Ermer, Waseca, MN (US); David Tusa, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 64 days.

(21) Appl. No.: 09/670,317

(22) Filed: Sep. 26, 2000

(51) Int. Cl.[7] .................. G01R 27/08; B60R 21/00
(52) U.S. Cl. .................. 324/691; 338/190; 701/45; 324/555
(58) Field of Search .................. 324/691; 338/190; 340/436; 701/45; 702/57; 280/735, 728.1; 307/10.1

(56) References Cited

U.S. PATENT DOCUMENTS

| | | | | |
|---|---|---|---|---|
| 3,656,061 A | * | 4/1972 | Mallory | 324/434 |
| 3,800,214 A | * | 3/1974 | O'Flynn | 324/508 |
| 3,896,455 A | * | 7/1975 | Steinbatz | 354/24 |
| 4,012,641 A | * | 3/1977 | Brickerd et al. | 307/106 |
| 4,196,691 A | * | 4/1980 | Imazeki | 116/309 |
| 4,253,004 A | * | 2/1981 | Oka | 200/331 |
| 4,654,626 A | * | 3/1987 | Carsello | 338/172 |
| 4,801,914 A | * | 1/1989 | Kerai | 338/162 |
| 5,557,681 A | * | 9/1996 | Thomasson | 381/67 |
| 5,630,756 A | * | 5/1997 | Thurston et al. | 463/38 |
| 5,689,285 A | * | 11/1997 | Asher | 345/161 |
| 5,818,946 A | * | 10/1998 | Walter | 381/68.4 |
| 6,037,571 A | * | 3/2000 | Christopher | 219/450.1 |
| 6,329,911 B1 | * | 12/2001 | Lehnst | 340/436 |

* cited by examiner

Primary Examiner—John E. Chapman
Assistant Examiner—T. R. Sundaizam
(74) Attorney, Agent, or Firm—Baker & Hostetler, L.L.P.

(57) ABSTRACT

A portable air bag simulator having a circuit that provides selectable resistance values between 0.5 ohms and 6.0 ohms. The air bag simulator can be used to simulate the resistance of a number of air bag models and can simultaneously simulate both the driver side and passenger side airbag.

20 Claims, 3 Drawing Sheets

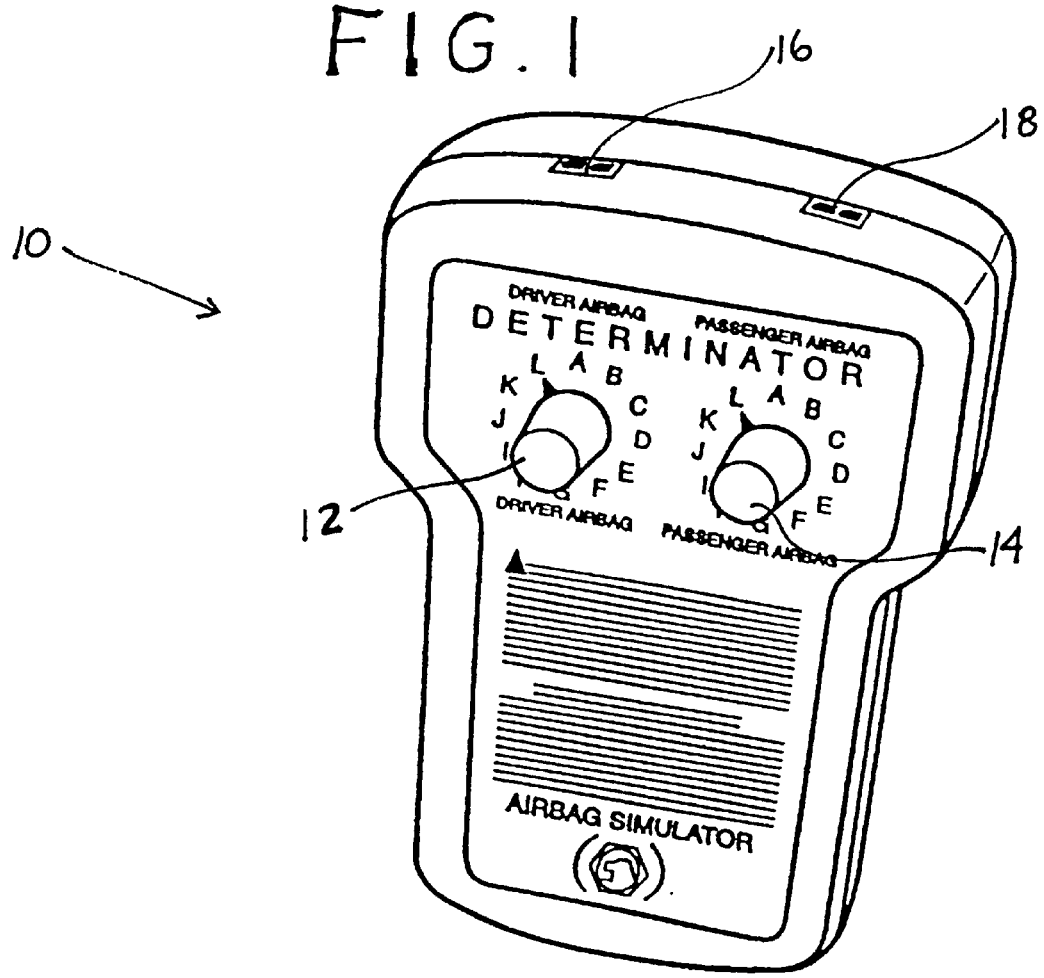

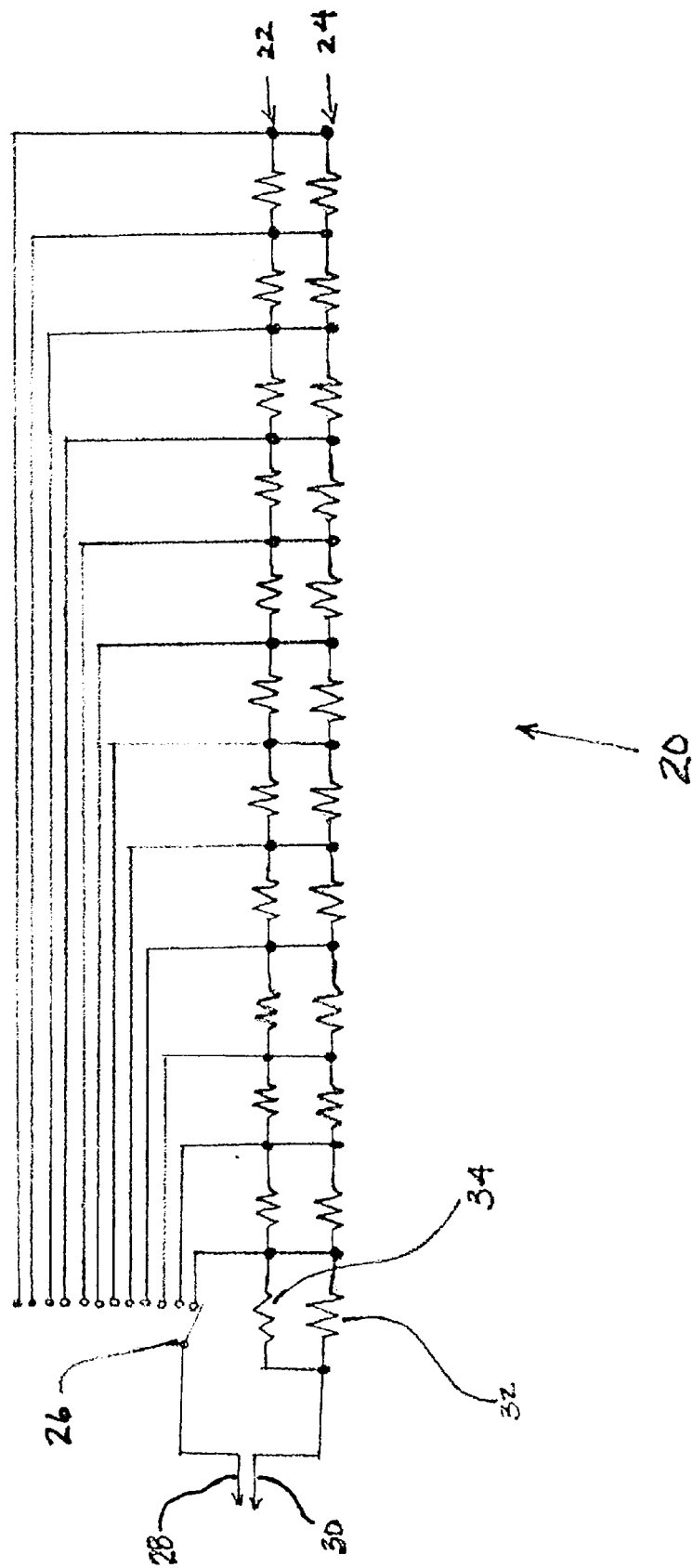

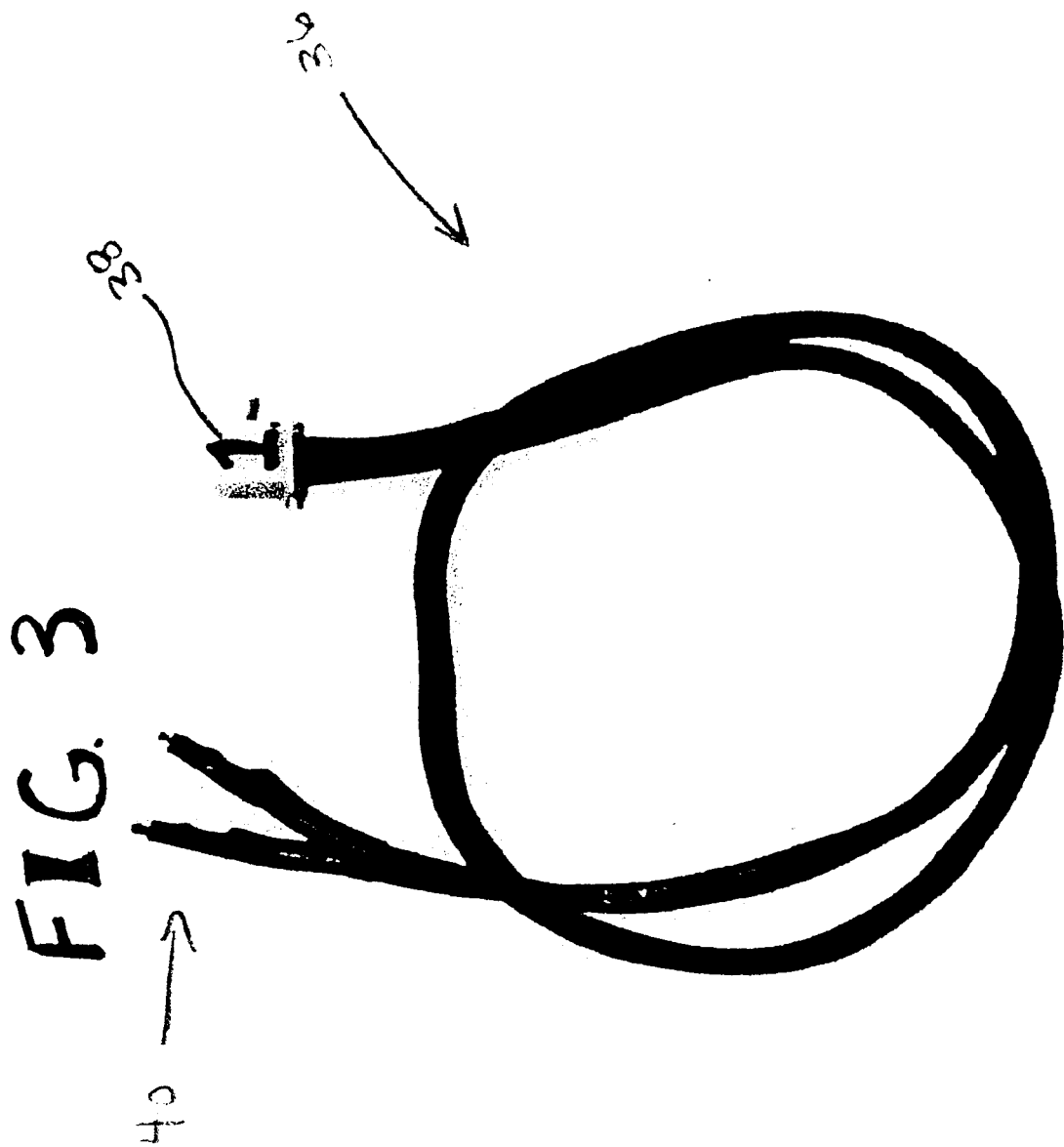

AIR BAG SIMULATOR AND METHOD OF SIMULATING AN AIR BAG

FIELD OF THE INVENTION

The present invention relates to the field of device simulators. More particularly, the present invention relates to simulators for use in testing air bag systems.

BACKGROUND OF THE INVENTION

In servicing air bag systems, it is advantageous to remove the air bag in order to prevent damage to the automobile or injury to the service technician caused by accidental deployments. Because air bag circuitry is designed to be inoperable when the air bag is not in the circuit, and thus cannot be tested, a device for simulating the air bag resistance in the air bag circuitry is needed.

Various devices currently exist to fill the need for simulating an air bag during testing and servicing of the air bag circuitry. The existing air bag simulators fall into two classes of devices: (1) large heavy models capable of withstanding high current loads, and (2) small portable (pen-shaped) models not suited to handling high current loads.

In order to withstand the large load currents, the large high current models utilize large load resistors. The size of these resistors, typically 8 inches by 10 inches by 4 inches, precludes their use in a portable/hand held product. Conversely, the smaller pen-shaped models are portable and thus do not occupy considerable shop space. However, because the smaller models typically utilize a single ½ watt resistor to simulate the air bag resistance they cannot handle the current load generated by an air bag deployment operation of the circuitry.

In addition to the foregoing limitations of the current air bag simulator devices, all of the currently existing simulator devices are specifically designed to simulate a particular air bag. For example, General Motors (GM) has at least four(4) different simulators for use in simulating the different air bag models used in its automobiles. Thus, a shop that services the air bag circuitry for different manufacturers and/or different automobile models have a need to purchase and store a number of simulator devices.

There is therefore a need for a portable, durable device that can be used to simulate the air bags utilized in different manufacturers automobiles.

SUMMARY OF THE INVENTION

The present invention satisfies, to a great extent, the need for a universal apparatus for testing air bag systems. This result is achieved, in an exemplary embodiment, by comprising in combination a portable universal air bag simulator with two movable rotary dials, essentially mounted on the front surface of the simulator wherein each rotary dial controls a circuit for simulating a driver air bag or a passenger air bag. The rotary dials have a plurality of settings, which provides for simulating resistance values from 0.5 ohm to 6.0 ohm in 0.5 ohm steps.

In another aspect of the invention the universal air bag simulator comprises cables that can adapt to nearly all manufacture air bag system applications as compared to conventional original equipment (OE) simulators.

The present invention provides a method of air bag resistance simulation that allows a technician to select the correct resistance for a number of air bags with a single device. It is envisioned that this device will be used by technicians in the aftermarket auto body and auto repair facilities, collision repair technicians, automotive technicians, and air bag specialists.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is a perspective drawing of a preferred embodiment of the air bag simulator of the present invention.

FIG. 2 is a schematic illustration of the circuit diagram of the air bag simulator of FIG. 1.

FIG. 3 is a perspective drawings of a cable used in connection with the air bag simulator of FIG. 1.

DETAILED DESCRIPTION OF A PREFERRED EMBODIMENT

Referring now to the figures, wherein like reference numerals indicate like elements, in FIG. 1 there is shown a universal air bag simulator apparatus 10 for use in dynamically testing driver and passenger air bag systems individually or simultaneously. The simulator has two rotary switches 12, 14 each providing a plurality of settings selected to correspond to the resistance of a driver or passenger air bag.

In a preferred embodiment of the simulator 10 each of the switches 12, 14 have twelve settings corresponding to different resistance values from 0.5 ohms to 6.0 ohms in 0.5 ohm steps. The simulator 10 is provided with a socket 16 for receiving the plug end of a lead cable for simulating the driver side air bag. A second socket 18 is provided in the simulator 10 for receiving the plug end of a lead cable for simulating the passenger side air bag.

Referring now to FIG. 2, there is shown a schematic illustration of a preferred embodiment of the air bag simulator circuit 20 of the present invention. While only one circuit 20 is shown, it should be understood that in the preferred embodiment two such circuits are provided, one for the driver side air bag and one for the passenger side air bag. The circuit 20 for simulating each of the driver and passenger side air bags is comprised of two parallel paths of twelve resistors 22, 24. Each resistor in the preferred embodiment is a one ohm ¼ watt 5% tolerance resistor. A twelve way switch 26 is provided to tap the parallel resistor paths 22, 24 allowing the user to select any number of parallel pairs of resistors between one and twelve. For example, in its first setting, the switch 26 taps the resistor paths 22, 24 to form a circuit between electrical contacts 28, 30 consisting only of resistors 32, 34.

It will be readily understood by those skilled in the art that, in this configuration, when the switch is set to its first setting a resistance of 0.5 ohms is provided between the electrical contacts 28, 30 with a power dissipation capability of ½ watt. It will also be readily understood that in each of its settings, the switch 26 will provide a different resistance value between 0.5 ohms and 6.0 ohms, in 0.5 ohm increments.

The circuit 20 for both the driver and passenger air bag simulators are preferably provided in the form of a single printed circuit board having the resistors surface mounted thereon. The use of the parallel arrangement of low wattage resistors, surface mounted on a printed circuit board, improves the ability of the circuitry to handle the current load provided by the air bag circuitry during an air bag deployment operation, allows the circuitry to be built in a compact portable unit, and allows the circuitry to be manufactured in a cost effective way.

By using the techniques described herein a durable simulator can be constructed more cost effectively than the devices employing high wattage resistors. As depicted in FIG. 1, the compact circuitry also permits the simulator 10 to be constructed as a hand held device thus reducing the shop space required for its storage. Additionally, because the presently described simulator is a universal device the cost and storage advantages are realized twelve-fold.

Referring to FIG. 3, there is disclosed an exemplary cable 36 for connecting the universal air bag simulator circuit 20 to the air bag system circuitry. As shown, the cable 36 has a plug end 38 that is mated to either of the driver or passenger sockets 16, 18 of the air bag simulator 10. The other end of the cable 36 is fitted with flying leads 40 specifically adapted to be used in connecting the air bag simulator circuitry 20 to a one or more manufacturers automobiles and one or more models of automobiles. The flying leads 40 are specially configured to ensure that a connection is made to the sockets of the air bag circuits.

In a preferred embodiment of the invention, the air bag simulator would be supplied with six cables, each of which has a plug end 38 mated to the driver and passenger sockets 16, 18. In addition to the plug end 38 mated to the air bag simulator sockets 16, 18, each of the six cables are provided with flying leads 40 for connecting to the air bag circuitry of one or more different air bags. The chart provide below identifies the six cables contemplated for use in connection with the air bag simulator of the preferred embodiment of the invention and the manufacturer and part numbers of each of the different sets of flying leads 40.

| Cable # | Flying Lead Manufacturer | Manufacturer Part # |
|---|---|---|
| #1 | YAZAKI | 7B16-1950-08 |
| #2 | Amp | 171661-1 |
| #3 | Amp | 1-928918-1 |
| #4 | Amp | 0-171662 |
| #5 | Amp | 172773-1 |
| #6 | Cardell | E7EB-14461-GA |

The chart below identifies the car models that each of the foregoing cables can be used with and the original equipment manufacturer (OEM) simulator tool that would be replaced by the simulator of the present invention when used with a particular cable. The location on the car where the socket is located for inserting the flying leads 40 of the cable is also identified in the chart. Finally, because certain car models require an OEM adapter to be used to connect to the airbag circuitry, the chart also identifies the OEM adapter used to connect to the air bag circuitry. The adapter, and location where it connects to the automobile, are specified by the manufacturer.

| Make | OEM Tool | Adapter | Connector Location | Cable |
|---|---|---|---|---|
| Saturn | SA94092-A | | Base of Column | 5 |
| | | | Driver Inflator | 4 |
| | | | Passenger Inflator | 5 |
| General | J-37808A | | Base of Column | 5 |

-continued

| Make | OEM Tool | Adapter | Connector Location | Cable |
|---|---|---|---|---|
| Motors | | | Steering Wheel | 5 |
| | J-38715A | | Base of Column | 5 |
| | | | Steering Wheel | 5 |
| | | | Passenger Inflator | 5 |
| | J-41433 | | Base of Column | 2 |
| | | | Steering Wheel | 2 |
| | | | Passenger Inflator | 2 |
| | | J-37808-10 | | 4 |
| | | J-37808-50 | | 2 |
| | | J-37808-55 | | 2 |
| | | J-38715-5 | | 2 |
| | | J-38715-10 | | 5 |
| | | J-38715-30 | | 4 |
| Chrysler | 8310A | | | 2 |
| | | | | 2 |
| | | | | 2 |
| | | MLR-8310-1 | Driver Airbag clockspring | 4 |
| | | MLR-8310-2 | Driver Airbag above clockspring or Passenger Airbag | 2 |
| | | MLR-8310-3 | Passenger Airbag with pressure switch | 4 |
| | | MLR-8310-4 | | 5 |
| | | MLR-8310-5 | | 5 |
| | | MLR-8310-6 | | 5 |
| | | MLR-8310-7 | | 2 |
| | | MLR-8310-8 | | 5 |
| Honda | 07SAZ-TB4012A | | | 2 |
| | 07SAZ-TB4013A | | | 2 |
| | 07TAZ-SZ5011A | | | 1 |
| | 07XAZ-S1A0200 | | | 3 |
| | 07XAZ-SZ30100 | | | 3 |
| Ford | 105-R0009 | | Driver & Passenger | 1 |
| | 105-R0008 | | Driver & Passenger | 2 |
| | 105-R0012 | | Driver & Passenger | 6 |
| | T94P-50-A | | Driver only | 3 |

It should be noted that the resistance value settings for the simulator tool, when used in connection with each of the foregoing models and connector locations can readily be determined.

It should be readily understood that the air bag simulator of the present invention can be provided using other methods of simulating the air bag resistance. For example, the combination of the switches and resistors can be replaced with a set of variable resistors provided with detent positions matched to each of the air bag resistances being simulated. Alternatively, the multi-way switch described herein could have each of its output paths connected to a separate isolated resistive load selected to match the resistance of one or more air bags.

It is envisioned that the air bag simulator of the present invention will be provided with instructions for its use. The simulator may also be provided with testing and service information for the various manufacturers air bag circuitry. The foregoing information can be provided either in document form or in electronic form, e.g., on a CD-ROM.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. An air bag simulator, comprising:
   a first output of said air bag simulator having at least a first and second electrical contact;

said first electrical contact being connected to a switch having a plurality of output terminals, each of said plurality of output terminals being connected to a first end of different resistance loads;

a second end of said resistance loads being connected to said second electrical contact;

wherein the first electrical contact is configured to provide a connection to a power transmitter adapted to communicate with an air bag system.

2. The air bag simulator of claim 1 wherein a series of resistors tapped at various points and connected to the output terminals form the resistance loads.

3. The air bag simulator of claim 1 wherein the series resistance further comprises two resistors in parallel.

4. The air bag simulator of claim 1 wherein a series of resistors tapped at various points range from 0.5 ohms to 6.0 ohms.

5. Air bag simulator according to claim 1, wherein said simulator outputs provide a means for connecting cables to a driver air bag or passenger air bag.

6. Air bag simulator for measuring resistance as recited in claim 5, wherein said connecting cables have a air bag simulator end and a manufacture air bag sensor end.

7. Air bag simulator according to claim 5, wherein said connecting cables comprise a plug end and a flying lead end specifically adapted to individual manufacture air bag systems.

8. Air bag simulator according to claim 1, wherein said switch is a rotary dial, said rotary dial controls a plurality of resistance channels for specific resistance measurements.

9. Air bag simulator according to claim 8, wherein the specific resistance measurements comprise different manufacturers air bag systems.

10. A device for simulating a plurality of air bags having different resistance values values comprising, a plurality of resistance units having different resistance values and an electrical contact configured to provide a connection to a power transmitter adapted to communicate with an air bag system.

11. A device according to claim 10, wherein said device is portable with dual outputs.

12. A device according to claim 10, wherein said device comprises twelve switch settings with resistance ranges from 0.5 ohms to 6.0 ohms.

13. A device according to claim 10, wherein each resistance unit comprises two resistors in parallel.

14. A method of simulating an air bag comprising the steps of:

replacing an air bag in an air bag system with a variable resistance load;

connecting an electrical contact to the air bag system configured to provide a connection to a power transmitter adapted to communicate with the air bag system; and adjusting the variable resistance load to match the resistance load of the replaced air bag.

15. The method of claim 14, wherein said adjusting step is accomplished using a switch having a plurality of output paths, each said output path being connected to a different resistance load.

16. The method of claim 15, wherein said different resistance loads are provided by a plurality of resistance loads in series and wherein said output paths of said switch tap into the series of resistance loads at different points.

17. The method of claim 16, wherein said plurality of resistance loads in series are each provided by a set of resistors in parallel.

18. The method of claim 14, further comprising the steps of:

replacing a second air bag with a second variable resistance load;

adjusting the second variable resistance load to match the resistance load of the second replaced air bag.

19. The method of claim 18, wherein said adjusting steps are accomplished using switches having a plurality of output paths, each said output path being connected to a different resistance load.

20. The method of claim 19, wherein said different resistance loads are provided by a plurality of resistance loads in series and wherein said output paths of said switches tap into the series of resistance loads at different points.

* * * * *